United States Patent
Parker et al.

(10) Patent No.: US 9,869,603 B2
(45) Date of Patent: *Jan. 16, 2018

(54) BALLOON CATHETER APPARATUS FOR INTERNAL COMBUSTION ENGINE COMPONENT LEAK DETECTION AND HIGH PRESSURE LEAK DETECTION

(71) Applicant: REDLINE DETECTION, LLC, Orange, CA (US)

(72) Inventors: Zachary M. Parker, Newport Coast, CA (US); Kenneth A. Pieroni, Yorba Linda, CA (US)

(73) Assignee: REDLINE DETECTION, LLC, Orange, CA (US)

(*) Notice: Subject to any disclaimer, the term of this patent is extended or adjusted under 35 U.S.C. 154(b) by 165 days.

This patent is subject to a terminal disclaimer.

(21) Appl. No.: 14/642,417

(22) Filed: Mar. 9, 2015

(65) Prior Publication Data
US 2015/0177092 A1   Jun. 25, 2015
US 2017/0322102 A9   Nov. 9, 2017

Related U.S. Application Data

(63) Continuation-in-part of application No. 13/926,919, filed on Jun. 25, 2013, now Pat. No. 9,417,153.
(Continued)

(51) Int. Cl.
*G01M 3/02* (2006.01)
*G01M 3/20* (2006.01)

(52) U.S. Cl.
CPC ............. *G01M 3/022* (2013.01); *G01M 3/20* (2013.01)

(58) Field of Classification Search
CPC ........ B08B 9/0322; F16K 7/10; F16L 55/134; F16L 2101/30; F16L 2201/30;
(Continued)

(56) References Cited

U.S. PATENT DOCUMENTS 1,506,418 A † 8/1924 Evensta
1,510,212 A    9/1924 Du Bois
(Continued)

FOREIGN PATENT DOCUMENTS

DE   4411928    1/1995
JP   59126223   7/1984
(Continued)

OTHER PUBLICATIONS

Patent Cooperation Treaty International Search Report, PCT/US2013060732; dated Feb. 11, 2015; 5 pages.
(Continued)

*Primary Examiner* — David A Rogers
(74) *Attorney, Agent, or Firm* — Stetina Brunda Garred & Brucker

(57) ABSTRACT

An inflatable, balloon-type catheter apparatus which is conformable to fit most all intake and exhaust systems to delivery pressure (with or without smoke) to test the fluid integrity of the fluid system. The device is configured to be inserted into the canal of the intake or exhaust system and inflated to seal off the fluid system. The pressurized smoke is passed through the inflated inlet adapter to test for leaks.

19 Claims, 4 Drawing Sheets

Related U.S. Application Data

(60) Provisional application No. 61/706,690, filed on Sep. 27, 2012.

(58) Field of Classification Search
CPC ........ G01M 3/022; G01M 3/005; G01M 3/26; G01M 3/3263
See application file for complete search history.

(56) References Cited

U.S. PATENT DOCUMENTS

| | | |
|---|---|---|
| 1,710,439 A | 9/1926 | Taylor |
| 2,192,155 A | 4/1937 | Schuldt |
| 2,299,116 A | 5/1941 | Svirsky |
| 2,273,984 A | 2/1942 | Osborn |
| 2,753,876 A | 3/1955 | Kurt |
| 2,764,243 A | 9/1956 | Page |
| 3,024,200 A | 3/1962 | Smith |
| 3,075,535 A | 1/1963 | Lasting |
| 3,431,945 A | 3/1969 | Robillard |
| 3,431,946 A | 3/1969 | Sawyer |
| 3,583,239 A | 6/1971 | Paine |
| 3,837,214 A | 9/1974 | Guest |
| 3,870,085 A | 3/1975 | Schneider |
| 4,352,515 A | 10/1982 | Schumacher |
| 4,354,515 A † | 10/1982 | Sutherland |
| 4,373,381 A | 2/1983 | Kulp et al. |
| 4,373,767 A | 2/1983 | Cairns |
| 4,460,019 A | 7/1984 | Condon |
| 4,550,751 A † | 11/1985 | Shimamura |
| 4,608,858 A | 9/1986 | McKinnon |
| 4,614,206 A * | 9/1986 | Mathison ................ F16K 35/06 138/89 |
| 4,750,525 A † | 6/1988 | Vaughan |
| 4,905,931 A | 3/1990 | Covey |
| 5,022,435 A | 6/1991 | Jaw-Shiunn |
| 5,353,842 A | 10/1994 | Lundman |
| 5,425,266 A | 1/1995 | Fournier |
| 5,390,738 A | 2/1995 | Eslinger et al. |
| 5,501,115 A | 3/1996 | Kamiyama et al. |
| 5,735,955 A | 4/1998 | Monaghan et al. |
| 5,771,937 A | 6/1998 | Collins |
| 5,859,363 A | 1/1999 | Gouge |
| 5,922,944 A | 7/1999 | Pieroni et al. |
| 6,018,615 A | 1/2000 | Loblick |
| 6,131,441 A | 10/2000 | Berube et al. |
| 6,142,009 A | 11/2000 | Loblick |
| 6,175,987 B1 | 1/2001 | Harvey |
| 6,267,001 B1 | 7/2001 | Duncan |
| 6,314,795 B1 | 11/2001 | Ingham |
| 6,336,482 B1 | 1/2002 | Cunkle et al. |
| 6,348,869 B1 | 2/2002 | Ashworth |
| 6,351,985 B1 | 3/2002 | Bedwell |
| 6,361,752 B1 | 3/2002 | Demarest et al. |
| 6,389,613 B1 | 5/2002 | Comas |
| 6,392,227 B1 | 5/2002 | Banyard et al. |
| 6,439,031 B1 | 8/2002 | Pieroni et al. |
| 6,502,603 B2 | 1/2003 | Lane, Jr. |
| 6,526,808 B1 | 3/2003 | Pieroni et al. |
| 6,651,486 B1 † | 11/2003 | Johnson |
| 6,899,138 B2 | 5/2005 | Lundman |
| 6,907,771 B2 | 6/2005 | Finlay et al. |
| 7,305,176 B1 | 12/2007 | Pieroni et al. |
| 7,556,072 B2 * | 7/2009 | Koch, Jr. ................ B27L 7/00 144/193.2 |
| 2001/0035046 A1 | 11/2001 | Williams |
| 2002/0152801 A1 | 10/2002 | Burke et al. |
| 2003/0047881 A1 | 2/2003 | Worm et al. |
| 2007/0079649 A1 | 12/2007 | Nauseda et al. |
| 2007/0297774 A1 | 12/2007 | Pieroni |
| 2009/0315326 A1 | 12/2009 | Pieroni |
| 2010/0095746 A1 | 4/2010 | Lund |
| 2013/0247651 A1 | 9/2013 | Grange |
| 2013/0319540 A1 | 12/2013 | Hegner |
| 2014/0083168 A1 | 3/2014 | Parker et al. |

FOREIGN PATENT DOCUMENTS

| | | | |
|---|---|---|---|
| JP | 59138935 | | 8/1984 |
| JP | 59138935 A | † | 8/1984 |
| JP | S9138935 A | | 8/1984 |

OTHER PUBLICATIONS

Patent Cooperation Treaty International Search Report, PCT/US2016/021586; dated May 11, 2016; 4 pages.

\* cited by examiner
† cited by third party

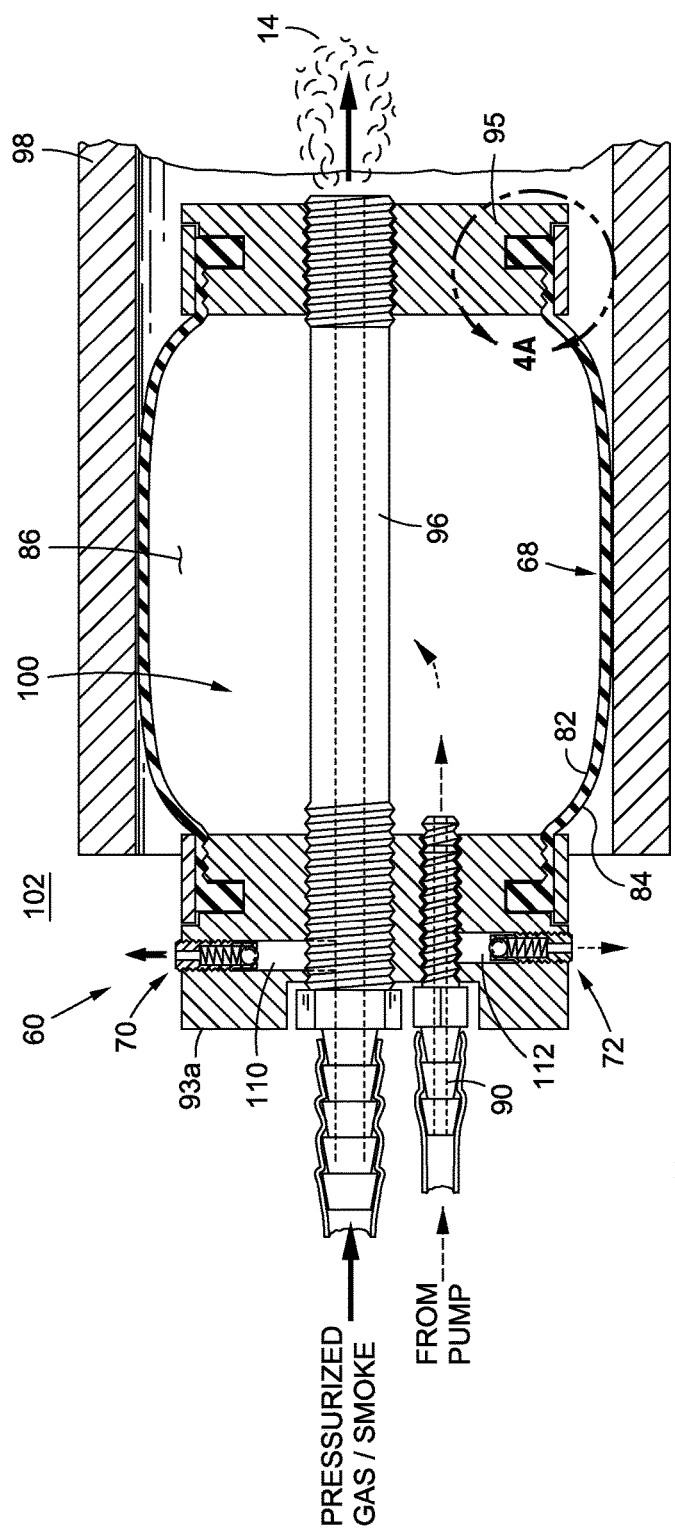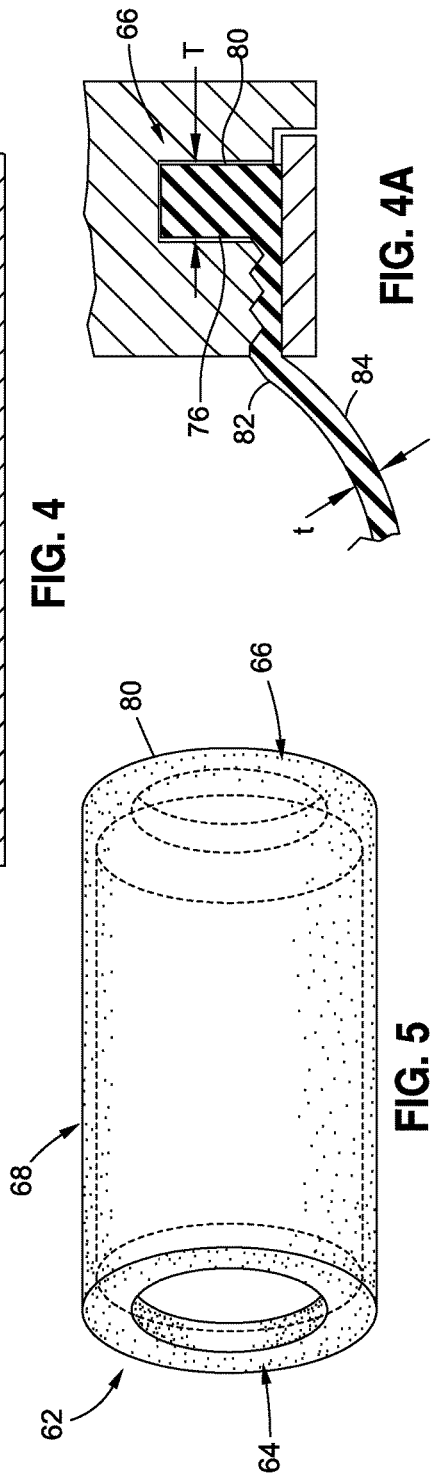

BALLOON CATHETER APPARATUS FOR INTERNAL COMBUSTION ENGINE COMPONENT LEAK DETECTION AND HIGH PRESSURE LEAK DETECTION

CROSS-REFERENCE TO RELATED APPLICATIONS

This application is a continuation-in-part of U.S. patent application Ser. No. 13/926,919, filed Jun. 25, 2013 entitled BALLOON CATHETER APPARATUS FOR HIGH PRESSURE LEAK DETECTION; which is the non-provisional application of U.S. Provisional Application No. 61/706,690, filed Sep. 27, 2012, entitled BALLOON CATHETER APPARATUS FOR HIGH PRESSURE LEAK DETECTION, the contents of which are expressly incorporated herein by reference.

STATEMENT RE: FEDERALLY SPONSORED RESEARCH/DEVELOPMENT

Not Applicable

BACKGROUND

1. Technical Field

The present disclosure generally relates to an inlet adapter for use with a fluid testing device, and more specifically, to an inflatable universal inlet adapter configured to form a fluid tight seal with the fluid system under test when the inlet adapter is inflated.

2. Related Art

There are many useful systems which contain and/or operate using a fluid (gas, liquid or combination of both). For example, automobiles have several systems which contain and utilize a fluid in their operation including the air intake/induction system, fuel system, the exhaust system, the heating, cooling and ventilation (HVAC) system, and the hydraulic power steering and brake systems, to name a few. Moreover, numerous industrial machines, household HVAC systems, and other devices utilize a fluid to operate. Such fluids include, for example, gases such as air or evaporated system liquid, fuel, hydraulic fluids, manufactured gases and liquids, and many other fluids.

In almost all circumstances, it is important, and in many cases crucial, that these fluid systems be properly sealed to prevent leakage of the system fluid or to prevent additional fluid/gases from entering the system. As an example, in a conventional internal combustion automobile air intake/induction system, the intake ducting and vacuum lines must be thoroughly sealed to prevent additional air from entering the system. The reason for this is that the leaks bypass the air filtration system to allow for unfiltered air containing contaminants to enter the system causing harm to the internal combustion engine and its components. In addition, the contaminated air enters the system unmetered (after the mass airflow sensor) which causes the vehicle to run lean. The on board engine management system will attempt to correct the air fuel mixture issue by adding more fuel which ultimately reduces fuel economy and hurts performance. In exhaust systems, it is important that the system is sealed in order to maintain the efficiency of the system and to ensure the many measurements relayed to the engine management system from temperature and oxygen sensors are accurate. A small air leak near an oxygen sensor may cause a diagnostic trouble code to trip the check engine light. Without checking for leaks, a technician may simply replace the oxygen sensor and reset the engine management system only to have the vehicle returned a few days later for the same issue. Again, faulty readings from sensors may cause the engine management system to increase fuel input as an attempt at solving the issue which only serves to increase fuel consumption and reduce fuel economy. As more vehicles are boosted or turbocharged, these higher pressures create even greater challenges for technicians. Some boost leaks only occur when the engine is running under load. A small leak in an exhaust system near the turbocharger of a heavy duty truck can cause inconsistent, too often or not enough, regeneration of the diesel particulate filter. This could result in either plugging up the DPF or perhaps running out of the diesel exhaust fluid or regeneration fluid either of which could render the vehicle inoperable. Leaks in either the intake or the exhaust system of boosted vehicles can wreak havoc with the information transmitted by pressure, temperature and oxygen sensors with the engine management systems altering fuel trim with incorrect data, thus reducing fuel economy and performance. High pressure diagnostic leak detectors or smoke machines have been developed that can recreate boost in a service center with the engine safely off.

In many cases, leaks in fluid systems are very difficult to detect and/or locate because the leak is small or in a location not easily accessible. Accordingly, a variety of devices have been devised to detect leaks in fluid systems. The most common diagnostic leak detectors utilize a visual indicator to locate a leak so that the leak may be repaired. The visual indicator is dispensed into the fluid system and leaks are detected by locating places on the system where the visual indicator is escaping the system.

Vaporized smoke is generally most useful for detecting leaks in gas systems and systems which have vapors. In general, devices for producing smoke for leak detection comprise a sealed chamber in which smoke is generated by vaporizing a smoke-producing fluid using a heating element. The smoke within the sealed chamber is forced out of the chamber through an outlet port by air pressure from a source of compressed air or gas pumped into the sealed chamber. This technology has become an essential tool for technicians to find all sorts of leaks including leaks in air induction systems, charged air coolers, turbochargers, exhaust systems, axels, climate control modules, central locking systems, wind and water leaks, driver cabins, sleeper cabins, doghouse canopy (e.g., cabin engine cover), air conditioning systems, coolant systems, etc.

Critical to most any fluid detection system is an inlet adapter which is able to mate the diagnostic leak detector to the system under test. In most cases, the inlet adaptor must contain the test fluid/vapor at the inlet end by making a fluid-tight seal. Historically, intake systems and exhaust systems have been tested using a cone-type adaptor inserted by hand with a diagnostic leak detector. However, these cone-type adaptors are typically only effective in openings that are substantially round, have enough interior clearance to insert the adaptor cone, and have an interior dimension no greater or smaller than the size limitations of the adaptor cone. The adaptor cones may only have a size range of a few inches and one might require multiple sizes and yet still not create a sufficient connection because of the limitations above. Technicians have been creative in finding temporary solutions when the cone adaptors did not fit. As an example, they might cover an opening with a latex glove or wrap the air filter in plastic and introduce vapor into the system through a vacuum or other line in the system. Historically, most intake and exhaust systems had round ports by which to utilize a cone adaptor so this method worked effectively.

There have been a number of developments recently that have made the above method and device much less effective. No longer is the intake ducting of most every vehicle substantially round with plenty of clearance to insert a cone adaptor. Many vehicles today have rectangular or oblong shaped intake ducting and the clearance has been reduced with smaller vehicles having sharp angles in ductwork. Furthermore, many vehicles today have rectangular exhaust tips or dual exhaust tips that cannot be serviced with a cone adaptor. In addition, boosted engines (with turbochargers or superchargers) have leaks that are typically present under load where the boost can be 10 PSI to 15 PSI, or in some cases over 20 PSI. These types of tiny leaks only make themselves known at high pressures (e.g., 10-20 PSI or higher). A conventional cone adaptor typically cannot be utilized at such higher pressures.

In view of the high pressure requirements, high pressure diagnostic leak detectors have been developed which produce smoke at elevated pressures for testing the fluid integrity of the fluid system. Inlet adapters are typically used with these high pressure diagnostic leak detectors; however, the inlet adapters are typically customized for use with a fluid system having conduits which are of one specific size and configuration.

Accordingly, there is a need in the art for a universal inlet adapter configured to deliver pressurized smoke into most all fluid systems. The present invention addresses this need, as will be discussed in more detail below.

BRIEF SUMMARY

According to an aspect of the invention, there is provided a balloon-type catheter apparatus which is conformable to fit most all intake and exhaust systems to deliver pressure (with or without smoke) to test the fluid integrity of the fluid system. The device is configured to be inserted into the canal of the intake or exhaust system and inflated to seal off the fluid system. The pressurized smoke is passed through the inflated inlet adapter to test for leaks.

One embodiment of the present invention includes a universal inlet adapter for a leak detection device using a pressurized detection media for detecting a leak in a fluid system having a fluid duct. The universal inlet adapter comprises an inflatable bladder selectively transitional between an inflated configuration and a deflated configuration. The inflatable bladder is configured to be engagable with the fluid duct to form a fluid tight seal therebetween as the inflatable bladder transitions from the deflated configuration to the inflated configuration. The universal inlet adapter further includes a test fluid delivery tube extending through the inflatable bladder such that the inflatable bladder is disposed radially outward from the test fluid delivery tube. The test fluid delivery tube is fluidly connectable with the leak detection device for delivering the pressurized detection media into the fluid duct for testing.

The inflatable bladder may define an internal bladder reservoir, and the test fluid delivery tube may traverse through the internal bladder reservoir. The inflatable bladder may be conformable to the shape of the fluid duct as the inflatable bladder transitions from the deflated configuration to the inflated configuration. The inflatable bladder may define a tubular configuration.

The test fluid delivery tube may be co-axially aligned with the bladder. The test fluid delivery tube is an elongate rigid tube. The test fluid delivery tube may define an internal passageway fluidly isolated from the internal bladder reservoir.

The universal inlet adapter may additionally include an inflation conduit fluidly connected to the inflatable bladder and fluidly connectable to a pressurized fluid source for selectively transitioning the inflatable bladder from the deflated configuration to the inflated configuration. A hand pump may be fluidly coupled or connectable to the inflation conduit for delivering fluid into the inflatable bladder for causing the inflatable bladder to transition from the deflated configuration to the inflated configuration. A compressed air line may also be fluidly coupled or connectable to the inflation conduit for delivering pressurized fluid into the inflatable bladder for causing the inflatable bladder to transition from the deflated configuration to the inflated configuration.

The universal inlet adapter may additionally include a pair of rigid end caps connected to the inflatable bladder at opposed end portions of the inflatable bladder. A pair of locking rings may cooperate with respective ones of the pair of rigid end caps to secure the bladder there between. The pair of rigid end caps may include a first rigid end cap and a second rigid end cap, wherein the first rigid end cap is connected to the test fluid delivery tube and the inflation conduit, and the second rigid end cap is connected to the test fluid delivery tube. The pair of rigid end caps and the test fluid delivery tube may be threadably engageable.

According to another embodiment, there is provided a method of testing the fluid integrity of a fluid system having a fluid duct. The method includes providing a leak detection device including an inflatable bladder selectively transitional between an inflated configuration and a deflated configuration, wherein the inflatable bladder is configured to be engagable with the fluid duct to form a fluid tight seal therebetween as the inflatable bladder transitions from the deflated configuration to the inflated configuration, and a test fluid delivery tube extending through the inflatable bladder such that the inflatable bladder is disposed radially outward from the test fluid delivery tube. The method additionally includes inserting the leak detection device into the fluid duct and inflating the inflatable bladder to create a fluid tight seal between the inflatable bladder and the fluid duct. The method further includes directing a test media into the fluid system via the test fluid delivery tube.

The inserting step may include inserting the leak detection device into the fluid duct such that a majority of the bladder is inserted into the fluid duct.

The inflating step may include using a hand pump or a compressed air line to inflate the inflatable bladder. The inflating step may include inflating the bladder to a pressure greater than the pressure of the test media. The inflating step and the directing steps may result in the creation of a pressure differential within the fluid duct on opposed sides of the bladder.

The method may additionally include the step of fluidly connecting the test fluid delivery tube to the test media. The method may further comprise the steps of deflating the bladder from the inflated position to the deflated position to break the fluid-tight seal between the bladder, and removing the leak detection device from the fluid duct.

According to another embodiment, the universal inlet adapter includes an inflatable bladder having a pair of opposed end wall portions and a tubular wall coupled to the pair of opposed end wall portions. The inflatable bladder includes an internal reservoir and is selectively transitional between an inflated configuration and a deflated configuration. The inflatable bladder is configured to be engagable with the fluid duct to form a fluid tight seal therebetween as the inflatable bladder transitions from the deflated configuration to the inflated configuration.

Each end wall portion may include an end wall internal surface and an opposed end wall external surface to define an end wall thickness therebetween. The tubular wall may include a tubular wall internal surface and an opposed tubular wall external surface to define a tubular wall thickness therebetween. The end wall thickness of each end wall may be at least approximately twice as large as the tubular wall thickness. The tubular wall and the end walls may define a unitary structure.

The universal inlet adapter may additionally include an exhaust passageway separate from the test fluid delivery tube and disposable in fluid communication with the fluid duct and the ambient environment. An exhaust passageway check valve may be in fluid communication with the exhaust passageway and moveable between closed and open positions relative to the exhaust passageway. The exhaust passageway check valve may be biased toward the closed position.

The universal inlet adapter may additionally include a bladder exhaust passageway in fluid communication with the internal reservoir and the external environment. A bladder exhaust check valve may be in fluid communication with the bladder exhaust and moveable between closed and open positions relative to the bladder exhaust passageway. The bladder exhaust check valve may be biased toward the closed position.

The universal inlet adapter may be configured and adapted to conduct pressurized testing at a range of different pressures, which may range from 0.4-20 PSI.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a side sectional view of another embodiment of the universal inlet adapter;

FIG. 4A is a partial sectional view of the inflatable bladder shown in FIG. 4; and FIG. 5 is an upper perspective view of the inflatable bladder depicted in FIG. 4.

Common reference numerals are used throughout the drawings and the detailed description to indicate the same elements.

DETAILED DESCRIPTION

Figure 1:
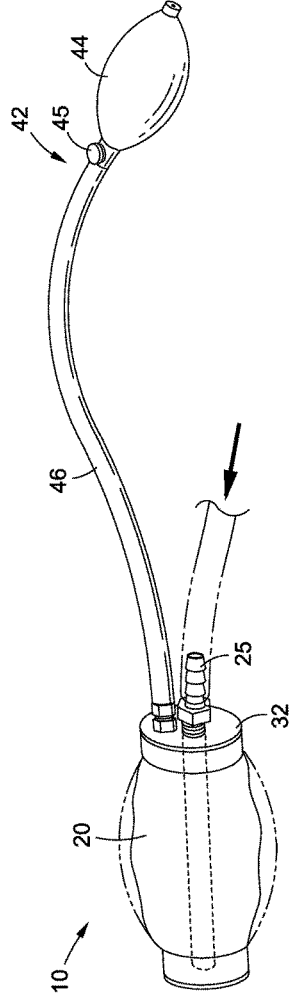
FIG. 1 is an upper perspective view of a universal inlet adapter configured for use with a pressurized test media for testing the fluid integrity of a fluid system.

The detailed description set forth below in connection with the appended drawings is intended as a description of the presently preferred embodiments of the invention, and is not intended to represent the only form in which the present devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Referring now to the drawings, wherein the showings are for purposes of illustrating a preferred embodiment of the present invention only, and are not for purposes of limiting the same, there is depicted a universal and inflatable inlet adapter 10 for use with a fluid leak detector. The inlet adapter 10 is configured to assume a deflated configuration to define a small profile to facilitate insertion of the inlet adapter 10 into a fluid system 12 for testing. Once inserted, the inlet adapter 10 is selectively transitional from the deflated configuration to an inflated configuration, wherein the inlet adapter 10 expands so as to create a fluid-tight seal between the inlet adapter 10 and the fluid system 12. The inlet adapter 10 is further configured to deliver test media 14 (e.g., smoke) into the fluid system 12 for identifying potential leaks within the system 12.

The inflatable inlet adapter 10 is configured to be conformable to the unique size and configuration of a fluid duct 16 (e.g., intake or exhaust) of the fluid system 12 being tested. In this regard, the degree to which the inlet adapter 10 is inflated typically depends directly on the size of the opening 18 defined by the fluid duct 16. The inlet adapter 10 will generally be inflated to a lesser degree for smaller fluid ducts 16, and to a greater degree for larger fluid ducts 16. Furthermore, the inflatable portion of the inlet adapter 10 will generally conform to the specific shape of the duct opening 18 to create a strong, fluid-tight seal between the fluid duct 18 and the inlet adapter 10.

The inlet adapter 10 includes an inflatable bladder 20 selectively transitional between the inflated configuration and the deflated configuration. The inflatable bladder 20 defines an internal bladder reservoir 22 which expands as the bladder 20 transitions from the deflated configuration toward the inflated configuration. The inflatable bladder 20 is preferably formed from an expandable, resilient and durable material capable of being inserted within fluid systems for testing. Along these lines, the material used to form the bladder 20 should have a sufficient thickness which provides strength and durability to the bladder 20 so as to mitigate inadvertent rupturing of the bladder 20, while at the same time allowing the bladder 20 to be flexible enough so as to generally conform to the unique shape of the fluid duct 16 as the bladder 20 transitions to the inflated configuration.

Figure 2:
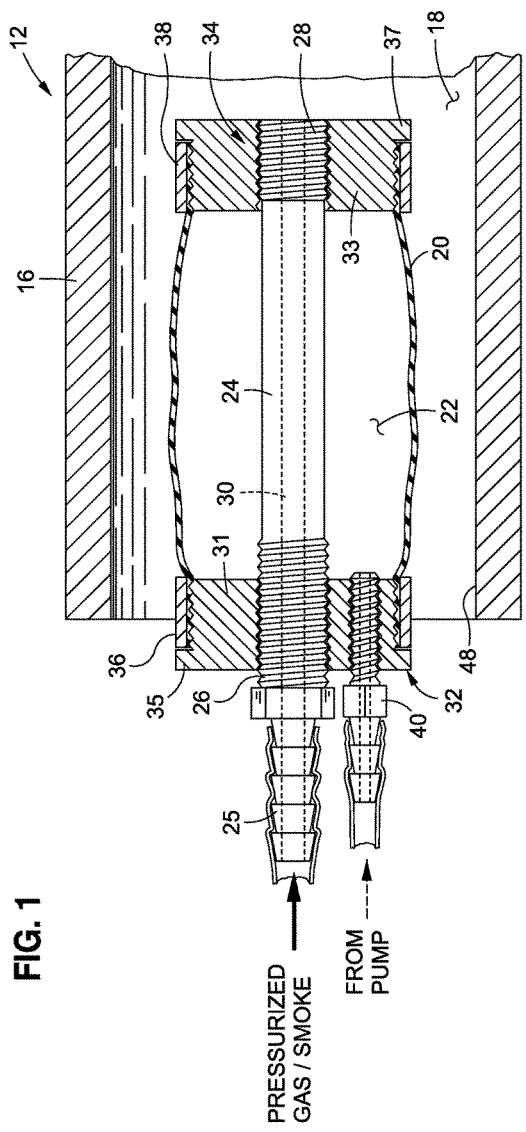
FIG. 2 is a side sectional view of the universal inlet adapter in a deflated configuration and inserted within a fluid duct of the fluid system.
Figure 3:
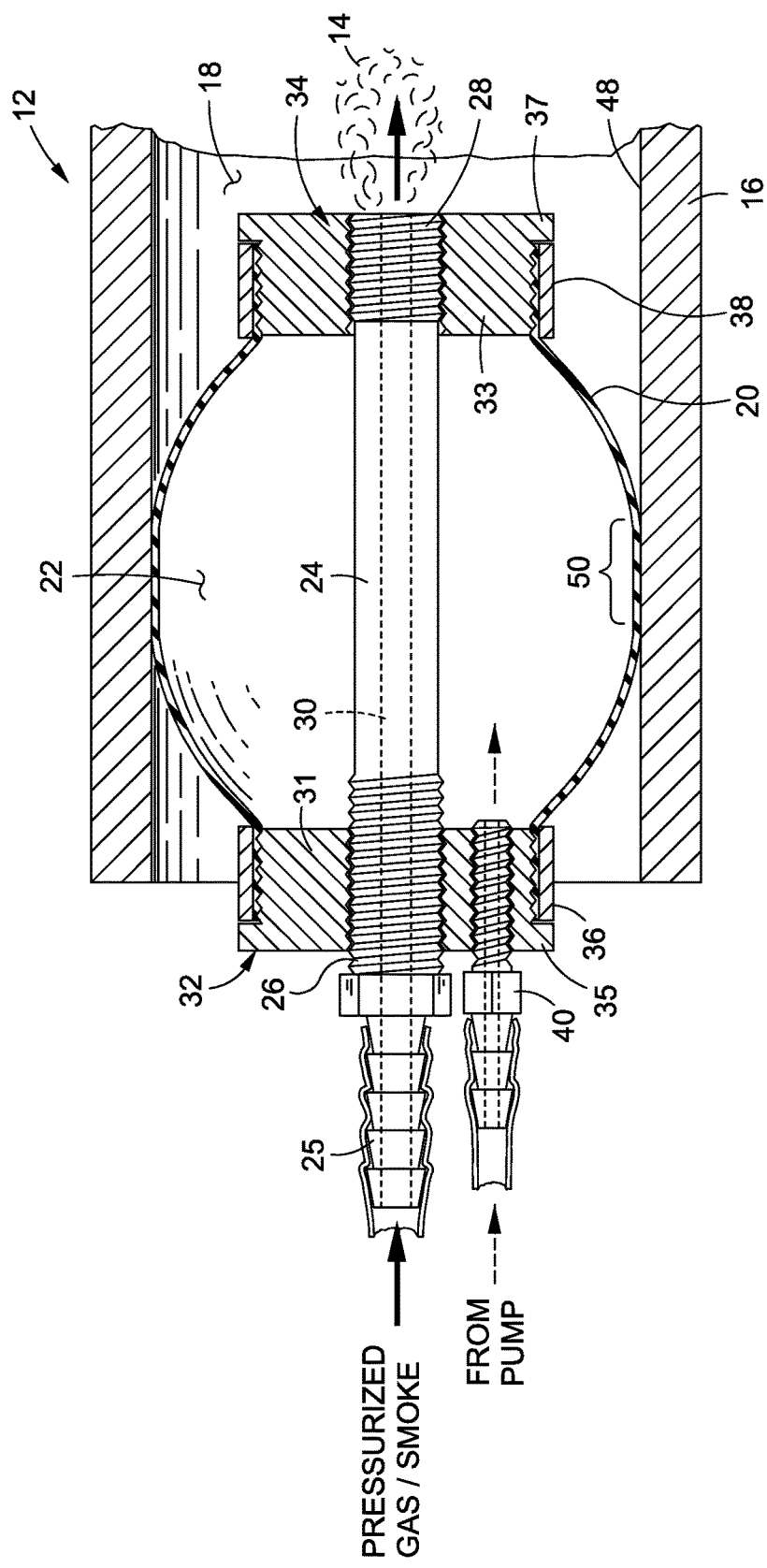
FIG. 3 is a side sectional view of the universal inlet adapter depicted in FIG. 2, with the universal inlet adapter depicted in the inflated configuration.

The exemplary bladder 20 depicted in FIGS. 1-3 is formed from a generally cylindrical sleeve having an opening extending through the sleeve. The bladder 20 preferably engages with a pair of rigid end caps 32, 34 at opposed ends of the bladder 20, as will be described in more detail below.

The universal inlet adapter 10 further includes a test fluid delivery tube 24 extending through the inflatable bladder 20 for delivering the pressurized detection media 14 (e.g., smoke) into the fluid duct 16 for testing. The test fluid delivery tube 24 includes a first end portion 26 connectable to the leak detection device to receive a pressurized testing media 14 therefrom, and an opposing second end portion 28 configured to deliver the pressurized test media 14 into the fluid duct 16 for testing. The test fluid delivery tube 24 defines an internal passageway fluidly 30 isolated from the internal bladder reservoir 22 and extending between the first and second end portions 26, 28.

According to one embodiment the test fluid delivery tube 24 is an elongate rigid tube extending through the bladder reservoir 24, and co-axially aligned with the bladder 20 such that the inflatable bladder 20 is disposed radially outward from the test fluid delivery tube 24. The test fluid delivery tube 24 may include a nipple or fluid connector 25 disposed adjacent the first end portion 26 and being fluidly connectable with the testing device for receiving the testing media 14 therefrom.

The universal inlet adapter 10 may additionally include a pair of rigid end caps 32, 34 connected to the inflatable bladder 20 at opposed end portions of the inflatable bladder 20. A first rigid end cap 32 is connected to the test fluid delivery tube 24 adjacent the first end portion 26 thereof and a second rigid end cap 34 is connected to the test fluid delivery tube 24 adjacent the second end portion 28 thereof. The end caps 32, 34 include respective insertion portions 31, 33 insertable into the bladder opening at respective ends of the bladder 20. Flange portions 35, 37 extend radially outward from respective insertion portions 31, 33 and preferably define a perimeter or diameter that is larger than the perimeter/diameter of the bladder 20 at the end portions.

In the exemplary embodiment, the test fluid delivery tube 24 is externally threaded at the first and second end portions 26, 28, while the first and second end caps 32, 34 include apertures which are internally threaded. The external threads on the test fluid delivery tube 24 engage with the internal threads formed on the rigid end caps 32, 34 to connect the end caps 32, 34 to the test fluid delivery tube 24. The threaded engagement between the test fluid delivery tube 24 and the rigid end caps 32, 34 preferably forms a fluid-tight seal between the test fluid delivery tube 24 and the rigid end caps 32, 24 to allow the bladder 20 to be inflated without fluid leaking through the interface between the delivery tube 24 and the end caps 32, 34. It is contemplated that a sealant may be used to strengthen the fluid-tight engagement between the delivery tube 24 and the end caps 32, 34.

A pair of locking rings 36, 38 may be used to connect the inflatable bladder 20 to the end caps 32, 34. Each locking ring 36, 38 cooperates with one of the pair of rigid end caps 32, 34 to secure the inflatable bladder 20 between the locking rings 32, 34 and the end caps 36, 38. The locking rings 36, 38 fit over respective insertion portions 31, 33 of the end caps 32, 34 and may be positioned adjacent to or in abutting relation with the respective flange portion 35, 37 of the end caps 32, 34. The locking rings 36, 38 may define an outer diameter that is flush with the outer diameter of the corresponding flange portion 35, 37. Furthermore, the locking rings 36, 38 may include smooth inner diameters which force contact at the tips of the barbs formed on the outer diameter of insertion portions 31, 33 to create an air tight seal. As the bladder 20 inflates, the expanding bladder 20 forces and holds the rings 36, 38 in place The engagement of the end caps 32, 34 to the delivery tube 24 preferably fixes the axial length of the inlet adapter 10, such that when the bladder 20 is inflated, the bladder 20 expands radially outward, rather than expanding in an axial dimension.

The universal inlet adapter 10 may additionally include an inflation conduit 40 fluidly connected to the inflatable bladder 20 and fluidly connectable to a pressurized fluid source for selectively transitioning the inflatable bladder 20 from the deflated configuration to the inflated configuration. The inflation conduit 40 extends through the first end cap 32 to deliver pressurized fluid from the fluid source into the bladder 20.

A hand pump 42 may be fluidly coupled or connectable to the inflation conduit 40 for inflating the bladder 20. In the exemplary embodiment, the hand pump 42 includes a pumping mechanism 44 and a pump conduit 46 for delivering pressurized fluid (e.g., air) into the bladder reservoir 22. The hand pump 42 may also include a release valve 45 for releasing fluid from the bladder 20 during deflation thereof. Although the exemplary embodiment includes a hand pump 42 for inflating the bladder 20, those skilled in the art will appreciate that an electrical pump may also be used for inflating the bladder 20.

Although the exemplary embodiment includes rigid end caps 32, 34, it is contemplated that other embodiments of the inlet adapter 10 may not include rigid end caps 32, 34. In this regard, the bladder 20 may be coupled directly to the delivery tube 24, and may include an inflation port integrated into the bladder 20 for inflation. Furthermore, it is also contemplated that other embodiments may include a hybrid design wherein a single rigid end cap is used at one end of the bladder 20, while the opposing end of the bladder 20 is formed without an end cap.

With the basic structural features of the inlet adapter 10 described above, the following discussion focuses on use of the inlet adapter 10 for testing the fluid integrity of the fluid system 12. With the bladder 20 in the deflated configuration, the inlet adapter 10 is inserted into the duct opening 18 such that a majority of the bladder 20 is inserted into the fluid duct 16. In this regard, a sufficient amount of the bladder 20 is inserted into the duct 16 so as to allow the bladder 20 to create a fluid tight seal between the bladder 20 and the inner surface 48 of the duct 16.

The inflatable bladder 20 is then inflated to create a fluid tight seal between the inflatable bladder 20 and the inner surface 48 of the fluid duct 16. As can be seen in FIG. 3, when the inflatable bladder 20 is inflated and begins to interface with the inner surface 48 of the fluid duct 16, the bladder 20 begins to conform to, or assume the shape of the inner surface 48 of the bladder 20. In particular, the pressure within the bladder 20 shown in FIG. 3 has caused the bladder 20 to engage with the inner surface 48 and to define a flattened region 50 that has assumed the shape of the inner surface 48.

As noted above, inflation of the bladder 20 may be achieved through the use of a hand pump 42, or an electrical pump, or via other inflation means known by those skilled in the art. Preferably, the bladder 20 is inflated to an internal pressure which is greater than the testing pressure so as to anchor the bladder 20 firmly within the fluid duct 16 during testing.

The method further includes directing the pressurized test media 14 into the fluid system 12 via the test fluid delivery tube 24. The pressurized test media 14 may be directed into the fluid system 12 by connecting the test fluid delivery tube 24 to testing device.

When the bladder 20 is inflated and the pressurized media 14 is directed into the fluid system 12, a pressure differential may be created within the fluid duct 16 on opposed sides of the bladder 20. In particular, the pressure within the fluid duct 16 on the downstream side of the bladder 20 (e.g., the side to which the pressurized media 14 is emitted) is greater than the pressure within the fluid duct 16 on the opposed side of the bladder 20. The fluid-tight seal between the bladder 20 and the duct 16 allows the creation of the pressure differential for conducting the fluid integrity testing.

It is contemplated that the fluid integrity testing may be conducted at various pressures, preferably in the range of 0.4-20 PSI, although those skilled in the art will recognize that tests performed at pressures outside of exemplary pressure range may also be conducted without departing from the spirit and scope of the present invention. Elevated testing pressures (i.e., 10-20 PSI) are preferable for boosted engines (with turbochargers or superchargers), wherein the leaks may only be detectable at such high pressures.

Once the testing is complete, the bladder 20 may be transitioned from the inflated position to the deflated position to break the fluid-tight seal between the bladder 20 and the fluid duct 16, and to facilitate removal of the inlet adapter 10 from the fluid duct 16.

Referring now specifically to FIGS. 3A-5, there is shown another embodiment of a universal inlet adapter 60. The primary distinction between the inlet adapter 60 shown in FIGS. 3A and 4 from the inlet adapter 10 shown in FIGS. 1-3 and discussed above is that the inlet adapter 60 includes an inflatable bladder 62 having a pair of end wall portions 64, 66 interconnected by a tubular wall 68. According to one embodiment, the end wall portions 64, 66 are received within corresponding cavities formed in end caps 93, 95 to facilitate engagement with the end caps 93, 95. The end wall portions 64, 66 are also preferably configured to enhance the strength of the inlet adapter 60 due to the end wall portions preferably being of a greater thickness than the tubular wall 68. The inlet adapter 60 shown in FIG. 4 also includes end cap 93a having a pair of check valves 70, 72, as will be described in more detail below.

Figure 3A:
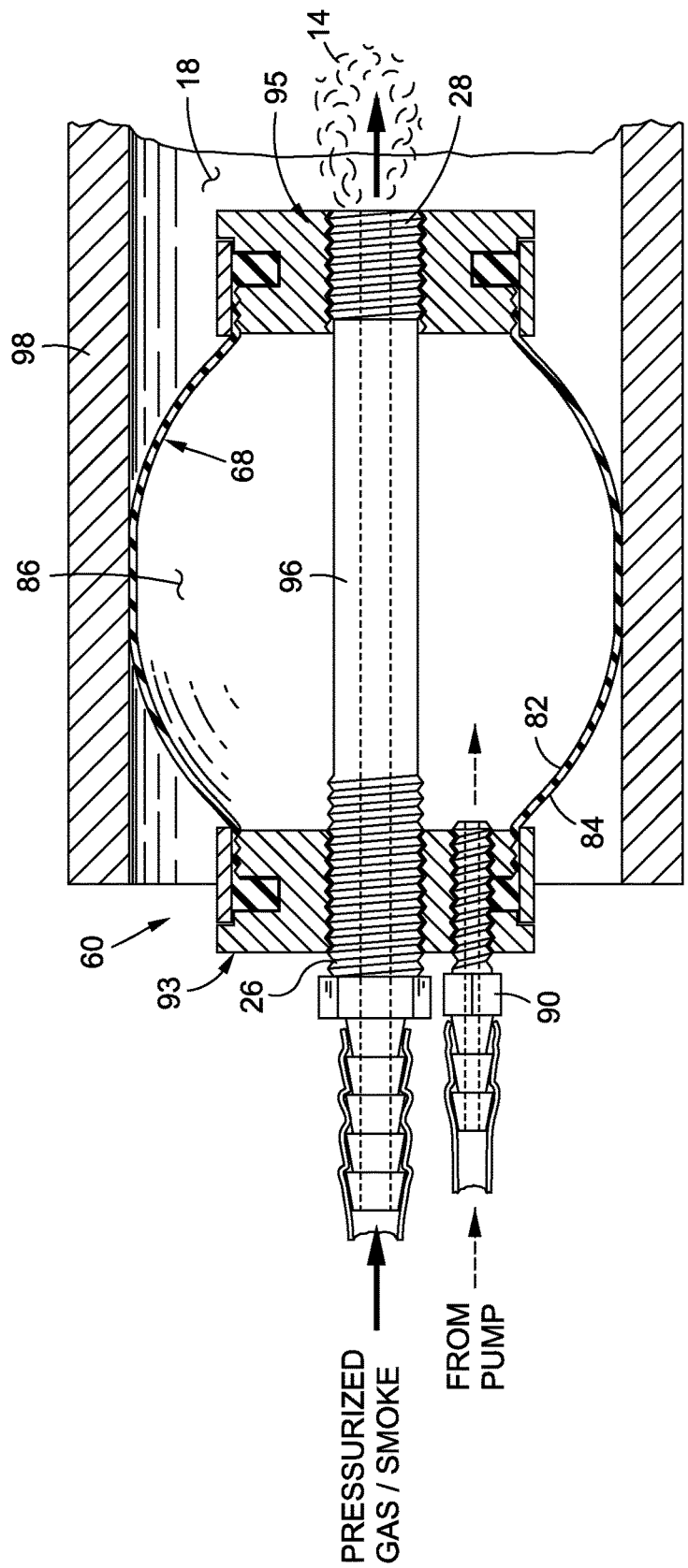
FIG. 3A is a side sectional view of a further embodiment of the universal inlet adapter.

The inflatable bladder 62 shown in FIGS. 3A and 4 defines a generally cylindrical configuration, with the end wall portions 64, 66 each being of an annular configuration (e.g., the end wall portions 64, 66 extend around an inner opening, which accommodates delivery of the testing media), while the tubular wall 68 is generally cylindrical and extends between the pair of opposed end wall portions 64, 66. Each end wall 64, 66 defines an internal surface 76 (see FIG. 4A) and an opposed outer surface 80. Likewise, the tubular wall 68 defines an inner surface 82 and an opposed outer surface 84. The end wall portions 64, 66 define a thickness "T" between their respective inner and outer surfaces, while the tubular wall 68 defines a thickness "t" between its inner and outer surfaces 82, 84. According to one embodiment, the thickness T of each end wall portion 64, 66 is approximately twice the thickness t of the tubular wall 68. The 2:1 ratio of the thickness T relative to the thickness t provides strength to the inflatable bladder 62 to protect the bladder 62 from distorting under high internal pressures.

The tubular wall 68 and the end wall portions 64, 66 may define a unitary structure. In this respect, the bladder 62 may be molded or otherwise formed with the tubular wall 68 and end wall portions 64, 66 being integral to each other. In a preferred embodiment, the tubular walls 68 and end wall portions 64, 66 are formed from a rubber material, although other resilient, flexible and durable materials known in the art may also be used without departing from the spirit and scope of the present invention.

The inflatable bladder 62 includes an internal reservoir 86 which is collectively defined by the inner surfaces of the end caps 93, 95 and the tubular wall 68. The bladder 62 is configured to be selectively transitional between an inflated configuration and a deflated configuration. To that end, the bladder 62 is connectable to a fluid source for supplying fluid/air into the bladder 62 for inflating the bladder 62.

The inflatable bladder 62 is configured to be engagable with the fluid duct 98 of system under test to form a fluid tight seal therebetween as the inflatable bladder 62 transitions from the deflated configuration to the inflated configuration. Thus, in order to create a fluid tight seal between the universal inlet adapter 60 and the fluid duct 98, the bladder 62 may be transitioned to the inflated configuration until a sufficient fluid-tight seal is formed between the bladder 62 and the inner surface of the duct 98. The fluid-tight seal is preferably maintained throughout the testing process. At the conclusion of the testing process, the bladder 62 may be transitioned to the deflated configuration, which results in termination of the fluid-tight seal and eases removal of the inlet adapter 60 from the duct 98.

According to one embodiment, an inflation fitting 90 extends through an inflation opening formed in end cap 93 and is configured to be connectable to a pump or other fluid source for supplying air into the internal reservoir 86.

The end cap 93 additionally includes a second opening formed therein and end cap 95 includes a complimentary third opening formed therein for introducing a pressurized detection media into the fluid duct 98 for testing. Preferably, a test fluid delivery tube 96 extends through the co-axially aligned openings and is threadably engaged with the end caps 93, 95 for delivering the detection media for testing.

According to one embodiment, and referring now specifically to FIG. 4, the universal inlet adapter 60 is configured to allow fluid to be exhausted from the testing system in the event pressure within the testing system becomes too high. In the exemplary embodiment, the end cap 93a includes an internal passageway 110 in fluid communication with the delivery tube 96 to enable fluid to be exhausted therefrom when pressure exceeds a prescribed threshold. The internal passageway 110 is also in fluid communication with the ambient environment 102 for discharging fluid thereto.

An exhaust passageway check valve 70 is in fluid communication with the internal passageway 110 and is moveable between closed and open positions relative to the exhaust passageway 100 to vent air to the ambient environment 102. In the exemplary embodiment, the exhaust passageway check valve 70 includes a spring biased valve member which is normally biased toward the closed position. However, when the pressure within the testing system overcomes the biasing force, the valve member is opened to allow fluid to be exhausted.

The end cap 93a further includes a bladder exhaust passageway 112 formed therein and in fluid communication with the internal reservoir 86 and the external environment 102 for discharging pressure from the bladder 62 in the event the internal bladder pressure exceeds a prescribed threshold. A bladder exhaust check valve 72 is in fluid communication with the bladder exhaust passageway 112 and is moveable between closed and open positions relative to the bladder exhaust passageway 112. In the exemplary embodiment, the bladder exhaust check valve 72 includes a spring biased valve member which is normally biased toward a closed position, wherein the bladder exhaust passageway 112 is blocked. However, when the pressure within the bladder 62 overcomes the biasing force, the valve member is moved out of the closed position and toward an open position to allow fluid to be exhausted from the bladder 62.

The particulars shown herein are by way of example and for purposes of illustrative discussion of the embodiments of the present invention only and are presented in the cause of providing what is believed to be the most useful and readily understood description of the principles and conceptual aspects. In this regard, no attempt is made to show more details than is necessary for a fundamental understanding of the disclosure, the description taken with the drawings making apparent to those skilled in the art how the several forms of the presently disclosed invention may be embodied in practice.

What is claimed is:

1. A universal inlet adapter for a leak detection device using a pressurized detection media for detecting a leak in a fluid system having a fluid duct, the universal inlet adapter comprising:
an inflatable bladder having:
a pair of opposed annular end walls disposed about a first axis, each end wall having an annular outer surface defining a terminal end of the inflatable bladder;
a tubular wall coupled to the pair of opposed end walls and disposed about the first axis, the tubular wall and the pair of opposed end walls being arranged such that the pair of opposed end walls extend inwardly from the tubular wall toward the first axis; and
an internal reservoir selectively transitional between an inflated configuration and a deflated configuration, a volume of the internal reservoir increasing as the inflatable bladder transitions from the deflated configuration to the inflated configuration;
a test fluid delivery tube extending through the inflatable bladder such that a portion of the inflatable bladder is disposed radially outward from the test fluid delivery tube, the test fluid delivery tube being fluidly connectable with the leak detection device for delivering the pressurized detection media into the fluid duct for testing; and
a pair of end caps coupled to the inflatable bladder, each end cap having an annular channel extending around the first axis to receive a respective one of the pair of opposed annular end walls including at least a portion of the annular outer surface of the corresponding annular end wall;
the test fluid delivery tube and at least one of the pair of end caps being sized and structured to enable translatable movement of the at least one of the pair of end caps relative to the test fluid delivery tube so that a distance between the pair of end caps is adjustable to adjust a configuration of the inflatable bladder.

2. The universal inlet adapter recited in claim 1, wherein:
each end wall includes an end wall internal surface and defines an end wall thickness as the distance between the end wall internal surface and the annular outer surface;
the tubular wall includes a tubular wall internal surface and an opposed tubular wall external surface to define a tubular wall thickness therebetween;
the end wall thickness of each end wall portion being at least approximately twice as large as the tubular wall thickness.

3. The universal inlet adapter recited in claim 1, wherein the tubular wall and the end wall portions define a unitary structure.

4. The universal inlet adapter recited in claim 1, further comprising an exhaust passageway disposable in fluid communication with the fluid duct and the ambient environment.

5. The universal inlet adapter recited in claim 4, further comprising an exhaust passageway check valve in fluid communication with the exhaust passageway and moveable between closed and open positions relative to the exhaust passageway.

6. The universal inlet adapter recited in claim 5, wherein the exhaust passageway check valve is biased toward the closed position.

7. The universal inlet adapter recited in claim 1, further comprising a bladder exhaust passageway in fluid communication with the internal reservoir and the external environment.

8. The universal inlet adapter recited in claim 7, further comprising a bladder exhaust check valve in fluid communication with the bladder exhaust and moveable between closed and open positions relative to the bladder exhaust passageway.

9. The universal inlet adapter recited in claim 8, wherein the bladder exhaust check valve is biased toward the closed position.

10. The universal inlet adapter recited in claim 1, wherein the test fluid delivery tube traverses through the internal reservoir.

11. The universal inlet adapter recited in claim 1, wherein the inflatable bladder is conformable to the shape of the fluid duct as the inflatable bladder transitions from the deflated configuration to the inflated configuration.

12. The universal inlet adapter recited in claim 1, wherein the test fluid delivery tube is an elongate rigid tube.

13. The universal inlet adapter recited in claim 1, further comprising an inflation conduit fluidly connected to the inflatable bladder and fluidly connectable to a pressurized fluid source for selectively transitioning the inflatable bladder from the deflated configuration to the inflated configuration.

14. The universal inlet adapter recited in claim 13, further comprising a hand pump fluidly coupled to the inflation conduit for delivering fluid into the inflatable bladder for causing the inflatable bladder to transition from the deflated configuration to the inflated configuration.

15. The universal inlet adapter recited in claim 1, wherein the test fluid delivery tube defines an internal passageway fluidly isolated from the internal bladder reservoir.

16. The universal inlet adapter recited in claim 1, wherein the inflatable bladder and test fluid delivery tube are capable of conducting pressurized testing at pressures ranging from 0.4-20 PSI.

17. The universal inlet adapter recited in claim 1, wherein each end cap includes a threaded surface adapted to interface with a corresponding threaded surface formed on the test fluid delivery tube to effectuate connection therebetween.

18. A method of testing the fluid integrity of a fluid system having a fluid duct, the method comprising the steps of:
inserting a leak detection device into the fluid duct, the leak detection device including:
an inflatable bladder having:
a pair of opposed annular end walls disposed about a first axis, each end wall having an annular outer surface defining a terminal end of the inflatable bladder;
a tubular wall coupled to the pair of opposed end walls and disposed about the first axis; and
an internal reservoir selectively transitional between an inflated configuration and a deflated configuration, a volume of the internal reservoir increasing as the inflatable bladder transitions from the deflated configuration to the inflated configuration;
a test fluid delivery tube extending through the inflatable bladder such that the inflatable bladder is disposed radially outward from the test fluid delivery tube; and a pair of end caps coupled to the inflatable bladder, each end cap having an annular channel extending around the first axis to receive a respective one of the pair of opposed annular end walls including at least a portion of the annular outer surface of the corresponding annular end wall;
  the test fluid delivery tube and at least one of the pair of end caps being sized and structured to enable translatable movement of the at least one of the pair of end caps relative to the test fluid delivery tube so that a distance between the pair of end caps is adjustable to adjust a configuration of the inflatable bladder
 inflating the inflatable bladder to create a fluid tight seal between the inflatable bladder and the fluid duct; and
 directing a test media into the fluid system via the test fluid delivery tube.

19. The method recited in claim 18, wherein the inflating step and the directing steps result in the creation of a pressure differential within the fluid duct on opposed sides of the bladder.

* * * * *